United States Patent Office 3,471,443
Patented Oct. 7, 1969

3,471,443
CURING PHENOL-ALDEHYDE NOVOLAK RESINS EMPLOYING ANILINE OR ANILINE Hcl
Leopold F. Bornstein, Wilmington, Mass., assignor to Georgia-Pacific Corporation, Portland, Oreg., a corporation of Georgia
No Drawing. Continuation-in-part of application Ser. No. 275,228, Apr. 24, 1963. This application Apr. 22, 1968, Ser. No. 723,300
Int. Cl. C08g 5/06
U.S. Cl. 260—56                    6 Claims

ABSTRACT OF THE DISCLOSURE

The curing rate of phenol-aldehyde novolak resins may be increased and/or the curing temperature of such resins may be decreased by effecting the cure of such novolaks with a suitable aldehyde cross-linking material in the presence of aniline and/or aniline salts such as aniline hydrochloride and/or the various homologues and analogues thereof.

PRIOR APPLICATIONS

This application is a continuation-in-part of application Ser. No. 275,228, filed Apr. 24, 1963, now abandoned, which, in turn, is a continuation-in-part of application Ser. No. 247,810, filed Dec. 14, 1962, now abandoned.

Novolak resins are solvent soluble, water insoluble resinous products prepared by the condensation reaction of less than a stoichiometric amount such as less than one mol, e.g. 0.70 to 0.85 of formaldehyde or other aldehydes such as furfural per one mol of phenol such as a mono or polyhydroxy aromatic such as hydroxy benzene compounds like polymethylene polyphenols, phenol, resorcinol, cresol, and hydrocarbon substituted hydroxy aromatic, such as alkyl substituted phenols resorcinol, etc. The resinous A stage products obtained are commonly fusible and are soluble in ketones, alcohols, alcohol-hydrocarbon mixtures and in other oxygen-containing solvents. These resins can be prepared in powdered, lump, liquid, or solution form. These resins require additional formaldehyde, paraformaldehyde, or a formaldehyde source like hexamethylenetetramine (hexamine) as methylene generating agents at the time or place of use to convert the resin to its infusible insoluble cross-linked state, e.g. sufficient additional formdehyde to provide a stoichiometric amount or more such as a total of 1.0 to 1.3 or more mols of formaldehyde per mol of phenol.

Novolak resins are characterized as those soluble resinous products prepared in the intial condensation step with a deficiency of aldehyde and which in the second step require an additional source of aldehyde to be converted into an infusible insoluble cross-linked resinous product. A typical novolak resin of the phenol formaldehyde type is in solid form and of a fusible thermoplastic nature.

Novolaks of phenol-formaldehyde, phenol-furfural, and phenol-furfural-formaldehyde commonly require for the initial condensation a catalytic amount of 0.1 to 5% of a catalyst such as an acid catalyst like a mono and polycarboxylic organic or inorganic acid or acid salts such as hydrochloric acid, sulfuric acid, acetic acid, oxalic acid, boric acid, etc., and their acid salts or an alkaline catalyst which includes caustic alkalies like sodium or potassium hydroxide or an alkali or alkaline earth oxide or hydroxide, ammonia or an amine.

A novolak resin is defined herein as the product obtained by condensation of a phenol and a defiency of aldehyde, and which, on application of heat, becomes thermoplastic and retains that characteristic. Novolaks are to be distinguished from those condensation resins produced with a stoichiometric amount of aldehyde and which, upon heating and/or aging, become thermoset.

I have discovered that small amounts, preferably from about 0.1 to about 2.0 weight percent based on resin, of aniline and aniline salts enhance the curing rate of resins at both low and elevated temperatures. These aniline salts can be added directly to a resin melt or solution or added to the pulverized resin during or after blending and grinding operations. Alternatively, the aniline salts can be employed in combination with sufficient hexamine or other formaldehyde source such as liquid formaldehyde solution, paraformaldehyde powder, or decomposable formate compounds such as calcium formate to obtain the desired infusible C stage resin.

I prefer to employ aniline salts as cure promoters for my invention rather than aniline itself, because of the low cost, commercial availability, and ease of handling characteristics of the salts, and the toxicity of aniline and difficulty and precautions necessary in handling the aniline oil. The salts such as aniline hydrochloride are also preferable for use in combination with hexamine with powdered resins cured at elevated temperatures. The unexpected effects of aniline and aniline salts are not based on the acidity of the acid portion of the salt, since the use of hydrochloric acid, boric acid, or oxalic acid alone inhibits a complete cure. Thus, the function of an acidic catalyst in resol type one step resins to lower the pH and to serve as a source of acidity is not comparable to the action of aniline cure promoters after formation of the novolak. Aniline salts in conjunction with normally slow curing novolak type phenol-furfural resins increase the curing time of these resins to those of phenol-formaldehyde resins such as by the addition of 1 to 2 weight percent based on the resin content of aniline hydrochloride mixed with the resin or mixed dry by grinding with hexamine. Aniline hydrochloride promotes a better cure in these resins than boric acid recommended in U.S. Patents 2,606,887 and 2,606,888.

The stoichiometric reaction between phenol and an aldehyde in the presence of a condensation catalyst produces a phenol-aldehyde thermosetting resin of the resol type. While aniline hydrochloride may be employed as a condensation catalyst in this reaction, it does not advantageously effect the rate of cure or thermosetting reaction, and indeed, can retard cure as compared with other available condensation catalysts. Thus, in such reactions, the aniline hydrochloride serves only to increase chain growth with an increase of molecular weight in the final resin.

On the other hand, when phenol and an aldehyde, in less than stoichiometric proportions, are reacted in the presence of condensation catalyst, a stable thermoplastic resin of the novolak type is obtained. As noted previously, the novolak resin is thermoplastic and not thermosetting. The addition to the novolak of a formaldehyde source produces a cured thermoset product. The addition of aniline hydrochloride to the novolak-aldehyde reaction mixture speeds up the cross-linking reaction between the resin and the aldehyde to give a thermoset product in a shorter period of time and/or at a lower temperature. Even if aniline hydrochloride is used in the first stage of novolak-forming reaction, it is effectively exhausted and unavailable in the second stage reaction. Further, whether aniline hydrochloride or one of the other well-known condensation catalysts is used as the condensation catalyst, the curing reaction will still be speeded up by the addition of aniline hydrochloride during the curing stage.

While the foregoing has been illustrated with respect to aniline hydrochloride, suitable cure promoters of my invention include, but are not limited to: aniline, and its homologues and analogous as well as the organic or in organic aniline salts such as aniline hydrochloride, aniline acetate, aniline oxalate, aniline phosphate, aniline sulfate, aniline borate, and the like. Aniline or an aniline salt can be blended with the resin or with liquid formaldehyde or paraformaldehyde which serve as a source for the additional aldehyde needed to effect a complete cure. With two step resins, hexamine can be used as a source of formaldehyde where the curing temperature is above about 220° F., that is, above the decomposition temperature of the hexamine.

The use of aniline salts as cure promoters in various novolak resins is illustrated in more detail in the following examples:

Example I.—Phenol formaldehyde novolak 8,400 lbs. of phenol are heated with 90 lbs. of oxalic acid to a temperature of 90° C. and cooled down to 30° C. 5,020 lbs. of 44% formaldehyde are added in three installments to control the exothermic reaction of the resin. After every installment of formaldehyde the temperature is brought by exothermic reaction or by jacket heating to reflux and cooled down to 40° C. before the following addition of formaldehyde. After all formaldehyde is in, 40 lbs. of hydrochloric acid is added and the reflux continued for 30 minutes. The resin is then distilled to 130° C. The vacuum is released and 40 lbs. of aniline hydrochloric (about 0.5% based on finished resin) is added to the batch and after short agitation, to promote the dissolving of aniline hydrochloride, the resin is discharged. The cooled resin is ground to about 200 mesh fineness and then blended with 8–10% of hexamine.

This resin can be made also in the same manner as described without aniline hydrochloride added to the resin. The aniline hydrochloride can be blended with the pulverized resin together with hexamine.

Stroke test on a hot plate at 150° C. of the resin without aniline hydrochloride, but with 8–10% of hexamine is between 45 seconds and 90 seconds. The same resin with .25% of aniline hydrochloride has a stroke test of 30–70 seconds. The resin with .50% of aniline hydrochloride has a stroke test of 20–50 seconds and the resin with 1% of hydrochloride has a stroke test of 15–40 seconds.

Example II.—Phenol furfural novolak 5,000 lbs. of phenol are charged to the kettle followed by 3,750 lbs. of furfural and then by 200 lbs. of potassium carbonate dissolved in 200 lbs. of water. The content of the kettle is then carefully brought to reflux and held at reflux temperature (visable reflux) for 90 minutes. The resin is then vacuumed distilled up to 150° C. until the desired melting point, 85–95° F. is reached. At this time 35 lbs. of aniline hydrochloride is added and agitated until dissolved. The resin is then discharged on pans for cooling and ground to a fineness of 200 mesh with 8–10% of hexamine.

Like the first example, aniline hydrochloride can be added during grinding operation or blending operation together with hexamine. The stroke cure on a hot plate at 150° C. of the resin with hexamine but without aniline hydrochloride is in the neighborhood of 120 seconds. The stroke cure of the same resin with .25% is in the neighborhood of 90 seconds. The stroke cure of the resin with .50% of aniline hydrochloride is in the neighborhood of 60 seconds and the stroke cure of the same resin with 1% of aniline hydrochloride is in the neighborhood of 45 seconds.

Example III.—Phenol formaldehyde-furfural novolak 1,875 lbs. of phenol are charged to the kettle followed by 938 lbs. of furfural. The kettle content is then heated to 90° C. and at this temperature 75 lbs. of dry potassium carbonate are added. The material is then heated to 130–140° C. and refluxed at this temperature for 30 minutes. The material is then cooled to 90° C. and 230 lbs. of 44% formaldehyde are added. The resin is brought to reflux again and held at reflux for 30 minutes. The resin is then distilled to 145° C. until the melting point of 85–95° C. is obtained. 15 lbs. of aniline hydrochloride are then dissolved in the resin before unloading as described in Example I. Aniline hydrochloride can also be added during grinding or blending operation as described.

Stroke tests of these resins without aniline hydrochloride is about 90 seconds, with .25% of aniline hydrochloride the stroke test is about 75 seconds, with .50% of aniline hydrochloride the stroke test is in the neighborhood of 60 seconds and with 1% of aniline hydrochloride the stroke test is in the neighborhood of 30 seconds.

Example IV.—Phenol-formaldehyde-novolak solution 2,540 lbs. of phenol is charged to the kettle followed by 15 lbs. of concentrated sulfuric acid 66 Be'. 1,520 lbs. of 44% formaldehyde is then charged in installments as described in Example I. After all formaldehyde is in and reflux temperature reached, the reflux is maintained for 15 minutes. The resin is then distilled until the water content, 6–8% as determined by the Carl-Fisher method, is established in the resin. The resin is then dissolved in 500 lbs. of denatured alcohol, cooled to room temperature. Various proportions of aniline hydrochloride are then added to the resin depending on the required curing speed (from .25%–2% based on the resin solids).

Stroke cure of this resin without aniline hydrochloride is about 75 seconds, with 0.25% of aniline hydrochloride the stroke cure is 60 seconds and with .50% of aniline hydrochloride the stroke cure is 45 seconds. With 1% of aniline hydrochloride the stroke cure is 40 seconds and with 2% of aniline hydrochloride the stroke cure is about 15 seconds. Stroke cure is determined after addition of 15% of hexamine dissolved in the resin before application. The hexamine content is based on the solid content of the resin. This resin is used in the foundry application for shell molding according to the coated sand method.

In the foregoing examples, aniline hydrochloride in combination with hexamine accelerated the cure of resin novolak at conventional elevated curing temperatures of about 250 to 350° F.

The improved cured resins of my invention can be used for bonding in molding applications, glass fiber insulation, in asbestos brake linings, in grinding wheels, etc. or for impregnation of paper, cloth, wood such as the preparation of plywood or other laminates or particle boards from wood, for example employing pressures of 200 to 500 p.s.i. at 275 to 325° F., use of 5 to 15 weight percent of resin to form boards of ¼ of an inch to 1½ inches in thickness. These resins can also be profitably employed in the foundry field with sand, clay or other refractory materials by mixing about 1 to 6 weight percent of the resin of Example IV with sand or the like; placing the mixture into a heated mold at a temperature of about 300 to 500° F., together with sufficient aniline salt to obtain a short cure and rigid shell or core. These resins also are useful as beater additives in forming sheet materials from aqueous slurries of natural and synthetic fibers such as cellulosic fibers, polyamides, polyurethanes, elastomers, polyolefines, cellulose esters, polyesters, etc.; as coating resins for metal foil like aluminum foil; and as molding resins with or without filler materials or other additives to improve impact strength, low temperature flexibility, mechanical strength, etc. For example, 10 to 25 weight percent of these improved resin novolaks can be admixed with 50 to −120 mesh wood flour and molded at from 500 to 1200 p.s.i. at temperatures of 300 to 350° F. for five to ten minutes for the fabrication of one inch thick articles. In phenolic molding compositions, about 40 to 60 weight percent resin and the remainder filler and their additives are commonly used.

My cure promoter can be admixed with inert filler materials such as from 10 to 200 weight percent filler based on the resin content. Suitable fillers would include wood flour, metals, metal oxides, alumina, silicates, clays, charcoal, carbon, coke, vitreous materials, diatomaceous earths, plastics; like polyethylene, polypropylene, polyvinyl chloride, rubber, SBR; fibers like cotton, glass, nylon, asbestos; as well as pigments, dyes, plasticizers, lubricants, anti-oxidants, stabilizers, hardeners, dispersants, wetting agents, etc.

What is claimed is:

1. In the method of preparing an infusible, insoluble, cross-linked, thermoset resinous product obtained by a first step of reacting a hydroxy monohydric benzene with less than a stoichiometric amount but at least about 0.70 mol per mol of hydroxy benzene of an aldehyde in the presence of a small amount of a condensation catalyst selected from the group consisting of mono and polycarboxylic acids, inorganic acids or acid salts thereof, and alkaline catalysts to obtain a novolak resin and the second step of reacting said novolak at a curing temperature with additional aldehyde sufficient to obtain the infusible, insoluble, C stage product, the improvement which comprises: effecting said second step of the reaction in the presence of a cure promoting amount of a cure promoter selected from the group consisting of aniline, aniline salts, and combinations thereof.

2. The method of claim 1 wherein a cure promoting amount is from about 0.1 weight percent to about 2.0 weight percent of the resin.

3. The method of claim 1 wherein the cure promoter is aniline hydrochloride.

4. The method of claim 1 wherein the hydroxy benzene is phenol and the aldehyde is formaldehyde and the curing temperature is about 250 to 350° F.

5. The method of claim 1 wherein the hydroxy benzene is phenol and the aldehyde is furfural and the curing temperature is about 250 to 350° F.

6. The cured infusible, insoluble resinous product prepared in accordance with the method of claim 1.

References Cited

UNITED STATES PATENTS

| | | | |
|---|---|---|---|
| 1,111,285 | 9/1914 | Aylsworth | 260—32.4 |
| 1,283,706 | 11/1918 | Edison | 260—57 |
| 1,868,079 | 7/1932 | Seebach | 203—8 |
| 2,495,175 | 1/1950 | Nagel | 154—140 |
| 2,934,511 | 4/1960 | Auerbach et al. | 260—38 |

FOREIGN PATENTS 3,498  2/1912  Great Britain.

OTHER REFERENCES

J. of Applied Chemistry, 6, 1956, Bishop, pp. 256–260.

WILLIAM H. SHORT, Primary Examiner
HOWARD SCHAIN, Assistant Examiner

U.S. Cl. X.R.

117—128.4, 132; 156—335; 161—262, 264; 260—17.2, 28, 38, 33.4, 59, 842, 844, 847